Jan. 4, 1949.　　　　　D. D. JONES　　　　　2,457,902
PRESSURE MEASURING APPARATUS
Filed Jan. 18, 1946
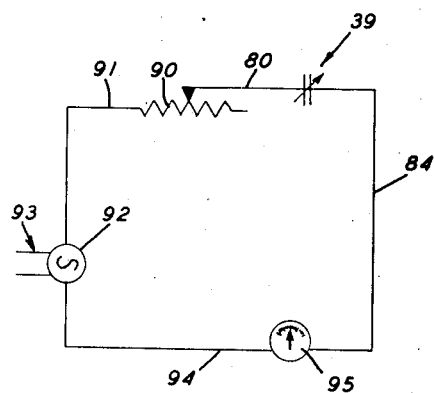
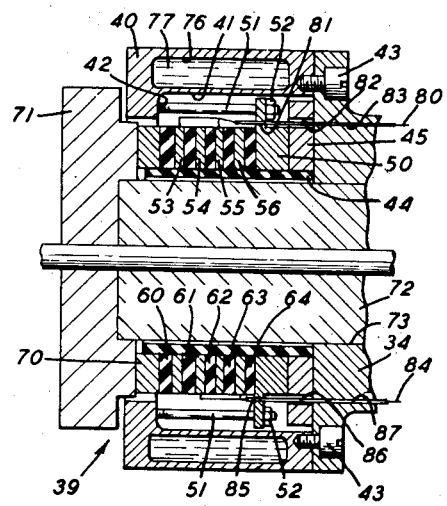
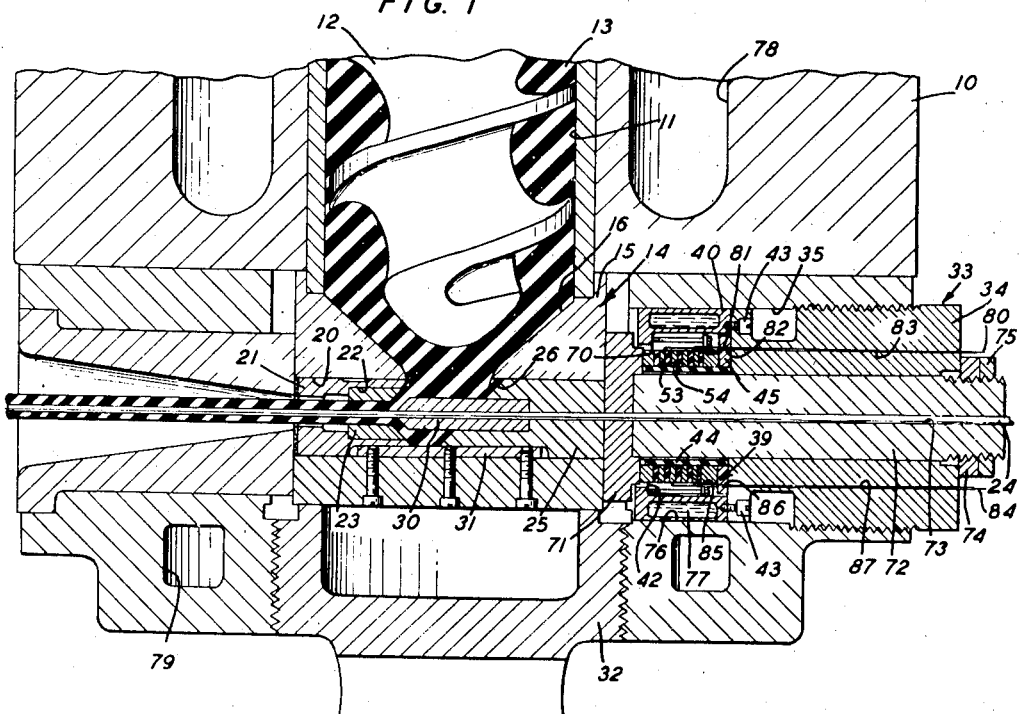
INVENTOR
D.D. JONES
BY
ATTORNEY Patented Jan. 4, 1949

2,457,902

UNITED STATES PATENT OFFICE 2,457,902

PRESSURE MEASURING APPARATUS

David D. Jones, Norwalk, Conn., assignor to Western Electric Company, Incorporated, New York, N. Y., a corporation of New York Application January 18, 1946, Serial No. 642,044

6 Claims. (Cl. 73—140)

This invention relates to pressure measuring apparatus and more particularly relates to apparatus for measuring pressures of material being extruded.

In the manufacture of insulated conductors, a conductor, which may be bare or covered, is sometimes advanced continuously through an extrusion head of an extrusion apparatus of a type which includes an extrusion passage in which an extrusion die is mounted and in which a core tube and a core tube holder are positioned for centering the conductor with respect to the extrusion die. The extrusion apparatus forces inulating material through the extrusion die under high pressures, whereby the die forms the insulating material into a covering on the conductor. The insulating material is brought to the extrusion apparatus in batches and the extrudability of the batches of insulating material may vary one from another. When it varies, it necessitates readjustment of the extrusion apparatus when a new batch of insulating material is extruded therethrough.

In the past, there has been no satisfactory means for determining the extrudability of each batch of insulating material without long experimentation, and the extrusion apparatus had to be adjusted by trial and error methods to obtain the most advantageous adjustment thereof. One of the main reasons why the extrudability of the various batches of insulating material could not be ascertained, was that no means were known for measuring the pressure of the insulating material as the insulating material was extruded. The high extrusion pressures of the insulating material in the extrusion apparatus aggravated the problem, since they made imperative pressure testing means which would satisfactorily withstand these high pressures.

An object of the invention is to provide new and effective pressure measuring apparatus.

A further object of the invention is to provide new and effective apparatus for measuring pressures of insulated material being extruded without interfering with the extrusion process.

In accordance with these and other objects, there has been provided an apparatus for testing the pressure of an insulating material being extruded through an extrusion passage in a continuous extrusion apparatus. As the insulating material is forced through the extrusion passage, it exerts pressure on a core tube and a core tube holder positioned in the extrusion passage for guiding a conductor through the extrusion passage. The core tube holder is forced against a backing plate of a compressible, variable condenser by the insulating material and the backing plate compresses resilient dielectric plates positioned between conductive plates of the condenser, so that the distance between the conductive plates of the condenser is decreased. This increases the capacitance of the condenser and this increase is measured by an ammeter positioned in series with the condenser. The ammeter is calibrated in terms of pressure of the insulating material and thus indicates the pressure of the insulating material as it is extruded through the extrusion passage.

A complete understanding of the invention may be obtained from the following detailed description of an apparatus forming a specific embodiment thereof, when read in conjunction with the appended drawing, in which:

Fig. 1 is a fragmentary, horizontal section of a continuous extrusion apparatus including pressure measuring apparatus forming one embodiment of the invention;

Fig. 2 is an enlarged fragmentary, horizontal section of a portion of the apparatus shown in Fig. 1, and Fig. 3 is a schematic view of an electrical circuit included in the apparatus.

Referring now in detail to the drawing, there is shown in Fig. 1 a continuous extrusion apparatus provided with pressure measuring apparatus forming one embodiment of the invention. The continuous extrusion apparatus is designed to apply a covering of plastic material, such as a vulcanizable rubber compound, upon a filamentary conductor, which may be bare or covered with a textile or plastic covering. This apparatus includes a body portion 10 having a cylindrical extrusion bore 11 formed therein in which a stock screw 12 is mounted. The stock screw is rotated by suitable driving means, such as an electric motor and a gear train, not shown) to force insulating material 13 through an extruding head 14 under high pressure. The extruding head includes a body member 15 having a tapered opening 16, which forms a continuation of the extrusion bore 11 and communicates with an extrusion passage 20 formed in the extruding head transversely of the tapered opening 16.

An annular die holder 21 is positioned in the exit end of the extrusion passage 20 and has a counterbore 22 formed therein in which is mounted a forming die 23. A conductor 24 is advanced toward the left, as viewed in Fig. 1, by suitable core-advancing means, such as a capstan, (not shown) through a core tube holder 25 and a core tube 30, which is held by the core tube holder 25. The core tube holder 25 is provided with an inclined concave surface 26 for deflecting the insulating material 13 toward the die 23. An aligning plate 31 maintains the die holder 21, and the core tube holder 25, and thereby the core tube 30, centered relative to each other in the extrusion passage 20, and a retaining nut 32 holds these elements in the extruding head 14.

The pressure of the insulating material 13 in the extruding passage 20 against the core tube 30 and the core tube holder 25 urges the core tube holder against the left end of a plug assembly 33, which includes a bolt 34 threaded into a bore 35 formed in the extruding head 14. A compressible, variable condenser 39 forms the left end of the plug assembly 33, as seen in the drawing, and includes an annular collar 40, which is provided with a cylindrical bore 41 therein. The annular collar 40 has a flange 42 on the left end thereof and is secured to the bolt 34 by bolts 43—43. A bushing 44 composed of electrically insulating material is positioned within the condenser 39 and within a metal thrust washer 45, which fits within the cylindrical bore 41 in the annular collar and abuts the end of the bolt 34.

An annular backing plate 50, which is mounted in the cylindrical bore 41 of the annular collar 40 by bolts 51—51 and nuts 52—52, abuts the thrust washer 45. Annular conductive plates 53, 54, 55 and 56 and resilient, annular dielectric plates 60, 61, 62, 63 and 64 interleaving the conductive plates are mounted slidably on the bushing 44, between the backing plate 50 and a thrust washer 70 which is slidably mounted on the left end of the bushing 44, as viewed in Fig. 2. The dielectric plates may be composed of a hard rubber compound which is compressed to only a slight extent under high pressure and has the quality of retaining no permanent deformation.

Normally a backing plate 71 rigidly secured to a central plug 72 having a passage 73 therein is held against the thrust washer 70 with a predetermined amount of force. This force is determined by a nut 74 and a lock nut 75, which are threaded on the right hand end of the central plug 72.

When the core tube holder 25 is urged to the right, as viewed in Fig. 1, by the insulating material 13, the force exerted thereon plus that exerted on the core tube 30 is transmitted to the dielectric plates 60, 61, 62, 63 and 64 through the backing plate 71 and the thrust washer 70. This causes the dielectric plates to be compressed more than normally and thereby decreases the distance between the conductive plates 53, 54, 55 and 56.

The annular collar 40 has a passage 76 formed therein through which cooling water 77, or other suitable coolant, flows to maintain the condenser 39 under an even temperature so that the heat of the body portion 10, which is heated by steam in a steam passage 78 and the extruding head 14, which is heated by steam in a steam passage 79, does not affect the condenser 39 excessively.

An insulated conductor 80 connected to the conductive plates 53 and 55 passes through a bore 81 formed in the backing plate 50, a bore 82 formed in the thrust washer 45 and a bore 83 formed in the bolt 34. An insulated conductor 84 connected to the conductive plates 54 and 56 extends through a bore 85 formed in the backing plate 50, a bore 86 formed in the thrust washer 45 and a bore 87 formed in the bolt 34. The conductor 80 is connected to an adjustable resistance 90 (Fig. 3), connected by a conductor 91 to one output terminal of an electrical oscillator 92, which is of known design and has an output frequency of around 15,000 cycles per second. The oscillator 92 is energized by an alternating current power line 93 and the other output terminal thereof is connected by a conductor 94 to a suitable ammeter 95. The conductor 84 also is connected to the ammeter 95.

The force with which the insulating material 13 presses the core tube 30 and the core tube holder 25 against the backing plate 70 is equal to the unit pressure of the material multiplied by the total of the transverse areas of the core tube and the core tube holder in contact with the insulating material which are known. Since the total contacted transverse areas of the core tube and the core tube holder are constant, the transmitted force is directly proportional to the pressure of the insulating material on the core tube and the core tube holder. This force is exerted in compression upon the dielectric plates 61, 62 and 63 and decreases them in thickness in direct proportion to the amount of the force.

The capacity of each of three condensers including that formed by the conductive plate 53, the dielectric plate 61 and the conductive plate 54, that formed by the conductive plate 54, the dielectric plate 62 and the conductive plate 55, and that formed by the conductive plate 55, the dielectric plate 63 and the conductive plate 56, may be expressed fundamentally by the formula $$C = \frac{KA}{4\pi d}$$

where C is the capacity, A is the area of one of a pair of the conductive plates, K is the dielectric constant of the dielectric plates, and $d$ is the distance between the pair of conductive plates.

K and A are constants in each of the individual condensers just described so that C and $d$ are the only variables and C is inversely proportional to $d$. Hence, as $d$, the distance between each adjacent pair of the conductive plates, is decreased, C, the capacity of the individual condenser, is proportionately increased. Since $d$ decreases directly with increases in the force compressing the dielectric plates, it follows that C is directly proportional to the pressure of the insulating material 13. The three individual condensers of the compressible condenser 39 are identical and are connected in parallel so that the capacity of the condenser 39 is equal to the sum of the capacities of the individual condensers thereof. Hence, the total change in capacity of the condenser 39 is three times the change of the capacity of one of the three individual condensers thereof for any given change in the pressure of the insulating material 13.

The circuit including the oscillator 92 (Fig. 3), the adjustable resistance 90, the compressible condenser 39, and the ammeter 95 is governed by the following formula:

$$I = \frac{E}{Z}$$

where I is the current, E is the voltage between opposite terminals of the oscillator, and Z is the impedance of the circuit.

E is constant so that I is inversely proportional to Z. The impedance Z is equal to the resistance of the adjustable resistance 90, which is a constant because the setting thereof is not varied after originally adjusting the circuit, plus the capacity reactance of the condenser, which fact may be indicated as follows:

$$Z = K + Xc$$

where $K$ is a constant equal to the resistance of the resistance 90 and $Xc$ is the capacity reactance of the condenser 39.

Substituting $K+Xc$ for $Z$, $$I = \frac{E}{K+Xc}$$

Since the values of $E$ and $K$ are constant, $$I \alpha \frac{1}{Xc}$$

Also, $$Xc = \frac{1}{2\pi f c}$$

where $f$ is the frequency of the circuit and $c$ is the capacity of the condenser. Hence, $$I \alpha 2 \pi f c$$

$f$, the frequency of the oscillator 92 is constant so that it may be said $I$ is proportional only to $c$, which is the capacity of the condenser 39, and varies in direct proportion to the pressure of the insulating material 13 in the extrusion passage 20 in the extruding head 14.

The reading of the ammeter 95 is directly proportional to $I$ and hence is directly proportional to the pressure on the insulating material 13 in the extrusion passage 20 in the extruding head 14. The ammeter is calibrated in units of pressure and indicates the unit pressure on the insulating material.

In the use of the pressure measuring apparatus forming a specific embodiment of the invention, the insulating material 13 is extruded by the extrusion apparatus under pressure and the pressure thereon compresses the condenser 39 thereby increasing its capacity proportionally. The reading of the ammeter 95 in the above-described circuit is proportional to the capacity of the condenser 39 and reads zero when no force is transmitted to the backing plate 71 by the core tube holder 25. However, when the insulating material 13 is extruded so that the core tube holder 25 is urged against the backing plate 71, the dielectric plates 61, 62 and 63 are compressed so that the capacity of the condenser 39 is increased. This increase in capacity will be measured by the reading of the ammeter 95, which will indicate the pressure on the insulating material 13 in extrusion passage 20 in the extruding head 14. However, the dielectric plates 60, 61, 62, 63 and 64 may be compressed only slightly even under very high pressures so that the position of the core tube holder with respect to the forming die 23 is not greatly affected.

The condenser 39 is very durable and serves as an accurate means of measuring the pressure of the insulating material 13 in the extrusion passage 20 in the extruding head 14 without adverse effect on the operation of the extrusion apparatus.

The pressure measuring apparatus described hereinabove provides information for adjusting the extrusion apparatus. It may be used to test the extrudability of samples of a particular batch of insulating material so that extrusion apparatus for extruding that batch may be adjusted accordingly. Also, it may be used to provide accurate data concerning the extrusion characteristics of compounds whose ingredients vary in kind or proportion. The core tube holder 25 may be made solid and the continuous extrusion apparatus may be used to extrude samples of a batch of the insulating material in order to determine the extrudability of the batch so that a standard extrusion apparatus may be adjusted correctly without experimentation thereon. Also, articles of other types than insulating coverings, for example tubes, rods or strips, with or without inserts, may be extruded by substituting suitable forming elements for the die 23 and the core tube 30, and the unit pressure of the plastic material may be accurately determined by the pressure measuring apparatus described hereinabove.

The pressure measuring apparatus described hereinabove may be used to measure the unit extruding pressures of many types of plastic materials, for example vulcanizable compounds including compounds of rubber or synthetic rubber-like materials, such as Buna compounds, polymerized chloroprene compounds, or the like. It likewise may be used with thermoplastic compounds made of polyethylene, polymerized vinyl compounds, such as vinyl halides, copolymers of vinyl halides and vinyl acetate, polymerized vinylidine halides, cellulose acetate, cellulose acetate butyrate or the like.

What is claimed is:

1. A pressure measuring apparatus, which comprises an extruding head having a passage extending therethrough which is provided with an entrance end and an exit end, means for forcing material into the central portion of the passage under pressure, means mounted slidably in the passage in the extruding head between the central portion and the entrance end of the passage for preventing flow of the material toward the entrance end of the passage, compressible means positioned in the passage in the extruding head between the entrance end of the passage and the flow preventing means and being compressible along its axis, fixed means for holding the compressible means against the flow preventing means so that the material under pressure compresses the compressible means, and means for measuring the pressure on the material from the compression of the compressible means.

2. In an extruding apparatus including an extruding head having an extrusion passage therein and also provided with an opening in communication with the extrusion passage and means for forcing a plastic material under a predetermined pressure into the extrusion passage in the extruding head, means for measuring the pressure on plastic material forced into the extrusion passage in the extruding head by the material-forcing means comprising a pressure-transmitting member mounted slidably in the opening in the extruding head with the inner end thereof in contact with the plastic material under pressure, said inner end of the pressure-transmitting member having a predetermined area in a plane transverse to the axis of the opening, a fixed abutment, resilient means positioned between the fixed abutment and the pressure-transmitting member for resisting movement of the pressure-transmitting member away from the extrusion passage in the extruding head, and means for measuring the linear displacement of the pressure-transmitting member by the pressure on the plastic material in the extrusion passage in the extruding head against the action of the resilient means to measure the pressure on the plastic material.

3. In an extruding apparatus including an extruding head having a passage therethrough, said passage having an entrance end and an exit end, annular means mounted slidably in the passage in the extruding head nearer the entrance end of the passage than the exit end thereof for guiding a core through the passage and for blocking the entrance end of the passage and means for forcing a plastic material under a predetermined pressure into the passage in the extruding head at a point between the slidable core-guiding means and the exit end of the passage, means for measuring the pressure of plastic material forced into the passage in the extruding head by the material-forming means comprising an annular pressure-transmitting member mounted slidably in the passage in the extruding head with the inner end thereof in contact with the end of the core-guiding means near the entrance end of the passage, a fixed annular abutment positioned in the entrance end of the passage in the extruding head, resilient annular means positioned between the fixed annular abutment and the annular pressure-transmitting member for resisting movement of the pressure-transmitting member toward the entrance end of the passage in the extruding head, said annular core-guiding means, said annular pressure-transmitting member, said annular abutment and said resilient annular means being axially aligned so as to provide clearance for the core, and means for measuring the linear displacement of the pressure-transmitting member from the pressure on the plastic material against the action of the resilient means to measure the pressure on the plastic material.

4. In an extruding apparatus including an extruding head having an extrusion passage therein, means positioned slidably in the extrusion passage in the extruding head for guiding a conductor through the extrusion passage and serving to block one end of the extrusion passage and means for forcing insulating material through the extrusion passage over a conductor guided by the conductor-guiding means, a device for measuring the pressure of the extrusion material in the extrusion passage comprising a fixed abutment, a slidable backing plate abutting the conductor-guiding means, a compressible condenser positioned between the fixed abutment and the slidable backing plate so that the condenser is compressed and the capacity thereof is varied in proportion to the pressure of the insulating material in the extrusion passage in the extruding head pressing against the slidable conductor-guiding means, and means in circuit with the condenser for measuring the pressure of the insulating material in the extrusion passage in the extruding head by means of the change in capacity of the condenser.

5. In an extruding apparatus including an extruding head having an extrusion passage therein, means positioned slidably in the extrusion passage in the extruding head for guiding a conductor through the extrusion passage and serving to block one end of the extrusion passage and means for forcing insulating material through the extrusion passage over a conductor guided by the conductor-guiding means, a device for measuring the pressure of the extrusion material in the extrusion passage in the extruding head comprising a fixed annular abutment, a slidable backing plate of annular shape abutting the conductor-guiding means, a compressible annular condenser positioned between the annular abutment and the slidable backing plate so that the condenser is compressed and the capacity thereof is varied in proportion to the pressure of the insulating material in the extrusion passage in the extruding head pressing against the slidable conductor-guiding means, said annular abutment, said backing plate of annular shape and said annular condenser being axially aligned so that the conductor may be advanced therethrough and means in circuit with the condenser for measuring the pressure of the insulating material in the extrusion passage in the extruding head by means of the change in the capacity of the condenser.

6. In an extruding apparatus including an extruding head having an extrusion passage therein and also provided with an opening in communication with the extrusion passage and means for feeding insulating material under a fixed pressure into the extrusion passage in the extruding head, a device for measuring the pressure of the insulating material in the extrusion passage in the extruding head comprising a condenser including several conductive plates and a plurality of resilient dielectric plates positioned between the conductive plates, said condenser being positioned in the opening in the extruding head, a fixed abutment for restricting movement of the condenser in the opening in the extruding head, means positioned between the extrusion passage in the extruding head and the condenser for transmitting force from insulating material fed under pressure into the extrusion passage by the material feeding means to the condenser so that the compressible dielectric plates of the condenser are compressed in proportion to the pressure on the insulating material, whereby the conductive plates of the condenser are forced closer together so that the capacity of the condenser is increased, a source of high frequency alternating current having a pair of output terminals, means for connecting alternate ones of the conductive plates of the condenser to one of the output terminals of the source of current, and means including a current measuring instrument for connecting the other output terminal of the source of current to the remainder of the conductive plates of the condenser, said current measuring instrument being calibrated in units of pressure for indicating the pressure on the insulating material in the passage in the extruding head.

DAVID D. JONES.

REFERENCES CITED

The following references are of record in the file of this patent:

UNITED STATES PATENTS

| Number | Name | Date |
|---|---|---|
| 525,769 | McElroy | Sept. 11, 1894 |
| 1,506,781 | Shrader | Sept. 2, 1924 |
| 1,939,041 | Cherry | Dec. 12, 1933 |
| 1,956,403 | Scott | Apr. 24, 1934 |
| 1,998,450 | Davis | Apr. 23, 1935 |
| 2,367,866 | Humphreys et al. | Jan. 23, 1945 |
| 2,368,278 | Warshaw | Jan. 30, 1945 |
| 2,399,342 | Gibbons et al. | Apr. 30, 1946 |